United States Patent
Szor et al.

(10) Patent No.: US 7,328,456 B1
(45) Date of Patent: Feb. 5, 2008

(54) METHOD AND SYSTEM TO DETECT DANGEROUS FILE NAME EXTENSIONS

(75) Inventors: Peter Szor, Northridge, CA (US); William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 882 days.

(21) Appl. No.: 10/718,375

(22) Filed: Nov. 19, 2003

(51) Int. Cl.
   *H04L 9/00* (2006.01)
(52) U.S. Cl. .................. 726/26; 726/22; 726/23; 726/24; 713/165; 713/167; 713/188
(58) Field of Classification Search .................. None
   See application file for complete search history.

(56) References Cited

U.S. PATENT DOCUMENTS

2003/0023864 A1* 1/2003 Muttik et al. ............... 713/200

OTHER PUBLICATIONS

Lee, A., et al,'Back to the Future—Fresh Approaches to Malware Management', EICAR Conf. Proceedings 2002, pp. 76-109, http://www.aomr.co.uk/papers/lee-harley.pdf.*
No author given. "Definition of file-type extension", Scala, Inc., p. 1 [online]. Retrieved on Aug. 22, 2003. Retrieved from the Internet:<URL:http://www.scala.com/definition/file-type-extension.html>.
No author given. "extension", Learnthat.com, p. 1 [online]. Retrieved on Aug. 22, 2003. Retrieved from the Internet:<URL:http://www. learnthat.com/define/e/extension.shtml>.
No author given. "extension", whatis.techtarget.com, p. 1 [online]. Retrieved on Aug. 22, 2003. Retrieved from the Internet: URL:<http://whatis.techtarget.com/ definition/0,,sid9_gci212088,00.html>.
No author given. "Extension Manager", PCWORLD.COM, pp. 1-2 [online]. Retrieved on Sep. 12, 2003. Retrieved from the Internet:<URL:http://www.pcworld.com/downloads/file_description/0,fid,15900,00.asp>.
No author given. "file name extension", Telecom Glossary 2K, p. 1 [online]. Retrieved on Aug. 22, 2003. Retrieved from the Internet:<URL:http://www.atis.org/tg2k/_file_name_extension. html>.
White, Myles, "Getting Windows to display file extensions could save you from virus attacks like "I Love You." New Virus Threat. Silly Season (virus hoaxes and other dumbness).", Toronto Star Fast Forward column for Jul. 20, 2000, pp. 1-3 [online]. Retrieved on Sep. 12, 2003. Retrieved from the Internet:<URL:http://www.computerwriter.com/Star/2000/jul/cw072000%20-%20getting_windows_to_display_file_.htm>.

* cited by examiner

*Primary Examiner*—Nasser Moazzami
*Assistant Examiner*—Ronald Baum
(74) *Attorney, Agent, or Firm*—Gunnison, McKay & Hodgson, L.L.P.; Lisa A. Norris (57) ABSTRACT

A file system event including a file name having at least a last file name extension is intercepted and stalled. The file name is parsed to obtain at least the last file name extension and a next to last file name extension, when present. A determination is made whether the last file name extension is the only file name extension of the file name. Upon a determination that the last file name extension is not the only file name extension of the file name, e.g., there are multiple file name extensions, a determination is made whether the last file name extension is a dangerous file name extension based upon the next to last file name extension. Upon a determination that the last file name extension is a dangerous file name extension, a notification is generated. Optionally, protective actions are implemented, such as terminating the file system event.

31 Claims, 5 Drawing Sheets

METHOD AND SYSTEM TO DETECT DANGEROUS FILE NAME EXTENSIONS

BACKGROUND OF THE INVENTION

1. Field of the Invention

The present invention relates to the protection of computer systems. More particularly, the present invention relates to a system and method for detecting and preventing malicious code attacks on computer systems, such as by computer worms having file names with multiple file name extensions.

2. Description of the Related Art

Some recently developed computer worms, such as the LoveLetter computer worm, exploited vulnerabilities of host computer systems and propagated from the host computer systems to other computer systems at a very fast rate. Due to the fast propagating nature of these computer worms, detection and prevention measures were typically developed and implemented after the computer virus had infected and damaged large numbers of computer systems.

SUMMARY OF THE INVENTION

In accordance with the invention, in one embodiment, a file system event including a file name is stalled. The file name is parsed to obtain at least a last file name extension. A determination is made whether the last file name extension is the only file name extension of the file name.

Upon a determination that the last file name extension is the only file name extension of the file name, the file system event is released. Alternatively, upon a determination that the last file name extension is not the only file name extension of the file name, e.g., there are multiple file name extensions, a determination is made whether the last file name extension is a dangerous file name extension. Upon a determination that the last file name extension is a dangerous file name extension, a notification is generated. Optionally, protective actions are implemented, such as terminating the file system event. Alternatively, upon a determination that the last file name extension is not dangerous, the file system event is released.

In some embodiments, the determination whether the last file name extension is a dangerous file name extension is optionally by-passed when the last file name extension is visible to a user.

Detecting file name extensions indicative of malicious code, e.g., dangerous file name extensions, before execution of the file system event, permits propagation of a malicious code file to be prevented.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

File names are conventionally used to identify files utilized by a computer system. File names generally include a base name and an optional file name extension, placed at the end of the file name. For example, the file name "paper.txt" has a base name of "paper" and a file name extension of ".txt".

File name extensions are often three characters long, but can be longer dependent on the operating system. Generally, a file name extension indicates to a computer system which program to associate with the file. Further, a file name extension allows a file's format to be described as part of the file name, allowing users to quickly understand the type of file without having to open the file.

Some malicious codes utilize an executing, or self-extracting, file format, and thus have a file name including a file name extension indicating an executable file, e.g., an executable file name extension. With increasing computer security awareness, more advanced users tend to not open and execute files having file names with executable file name extensions when a file is not expected or the user does not recognize the sender. Consequently, malicious code present in the file is typically not launched or propagated by these users.

Unfortunately, some operating systems, such as Windows® 98, by default, hide, e.g., mask, the file name extension, preventing users from ascertaining whether a file is executable or non-executable. In exploiting this feature, some malicious code generators use double file name extensions, with an innocuous, or non-executing, file name extension preceding the executable file name extension at the end of the file name. Thus, operating systems configured with the default masking of the file name extension hide the last file name extension of the file name, e.g., the executable file name extension, from the user, and the user sees a seemingly safe file name extension, e.g., the next to last file name extension. Consequently, some users open and execute the malicious code file unaware that the file was actually an executable file.

For example, some computer systems have been attacked by computer worms, such as the LoveLetter computer worm, which sends itself to others computer systems in an e-mail attachment having multiple file name extensions, such as "iloveyou.txt.vbs", where ".vbs" is an executable file name extension. If the operating system of a receiving computer system is configured to mask the file name extension, e.g., the last file name extension of ".vbs", a user would see "iloveyou.txt" displayed. Consequently, some users, assuming an innocuous text file has been sent, open the file. Once the file is opened, the e-mail application launches the malicious code, the malicious code is executed, and the computer worm is propagated to the user's system.

Figure 2:
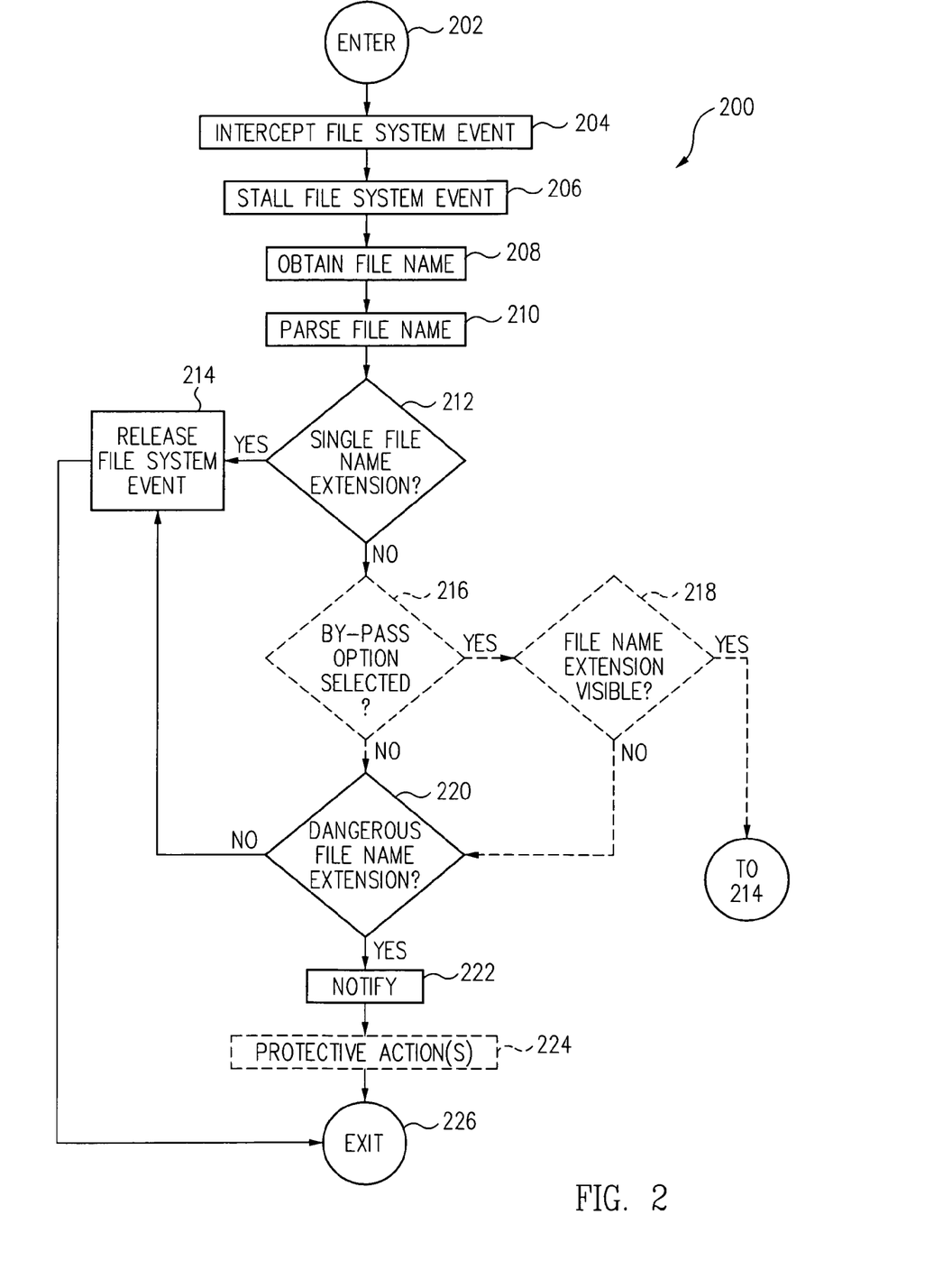
FIG. 2 illustrates a process flow diagram of a host computer method for detecting dangerous file name extensions in accordance with one embodiment of the present invention.
Figure 3:
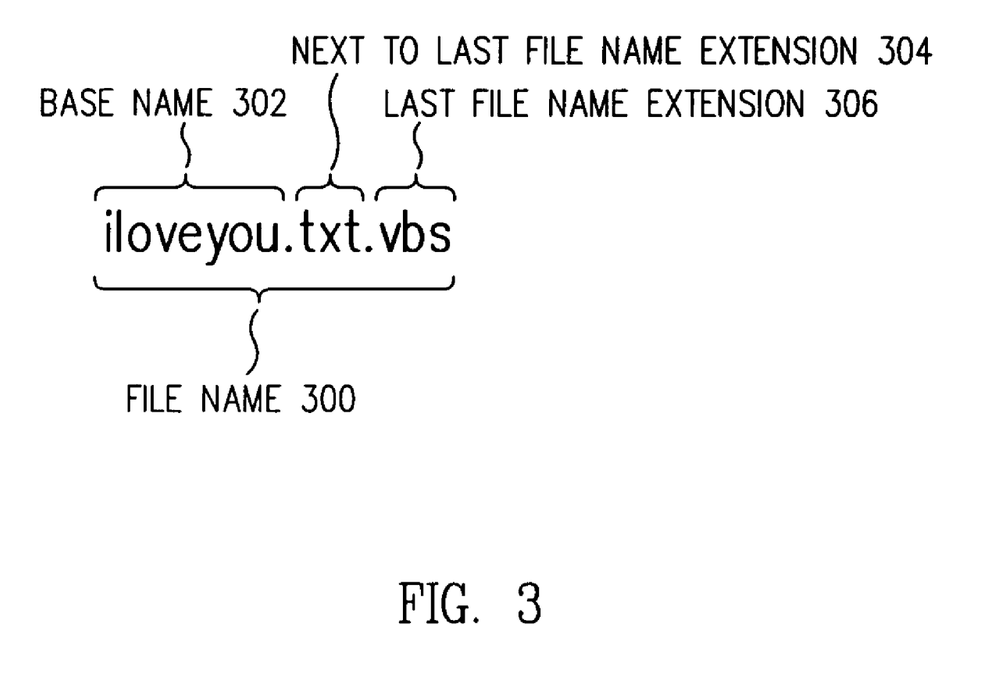
FIG. 3 illustrates an example of a malicious code file name including multiple file name extensions.

In accordance with the invention, referring to FIGS. 2 and 3, in one embodiment, a file system event including a file name, such as a file name 300, is intercepted and stalled (operations 204, 206) prior to execution of the file system event. File name 300 is obtained and parsed to obtain at least a last file name extension, such as a last file name extension 306, and a next to last file name extension, such as a next to last file name extension 304, when present in the file name.

A determination is made whether last file name extension 306 is the only file name extension of file name 300 (check operation 212). Upon a determination that last file name extension 306 is not the only file name extension of file name 300, a determination is made whether last file name extension 306 is a dangerous file name extension based upon next to last file name extension 304 (check operation 220).

Upon a determination that last file name extension 306 is a dangerous file name extension, a notification is generated, for example, notifying a user of the dangerous file name extension (operation 222). Optionally, protective actions are implemented (operation 224), such as terminating the file system event. Alternatively, upon a determination that last file name extension 306 is not dangerous, the file system event is released (operation 214). In some embodiments, a by-pass option permits a user to by-pass the determination whether the last file name extension is a dangerous file name extension when last file name extension 306 is visible to a user (check operations 216, 218).

Detecting file name extensions indicative of malicious code, e.g., dangerous file name extensions, before execution of the file system event, permits propagation of a malicious code file to be prevented. While embodiments are described herein with reference to computer worms, embodiments in accordance with the present invention are also applicable to other malicious code utilizing multiple file name extensions.

Herein, malicious code is defined as any computer program, module, set of modules, or code that enters a computer system without an authorized user's knowledge and/or without an authorized user's consent. Further herein, malicious code activity is defined as any activity that is indicative of malicious code.

Figure 1:
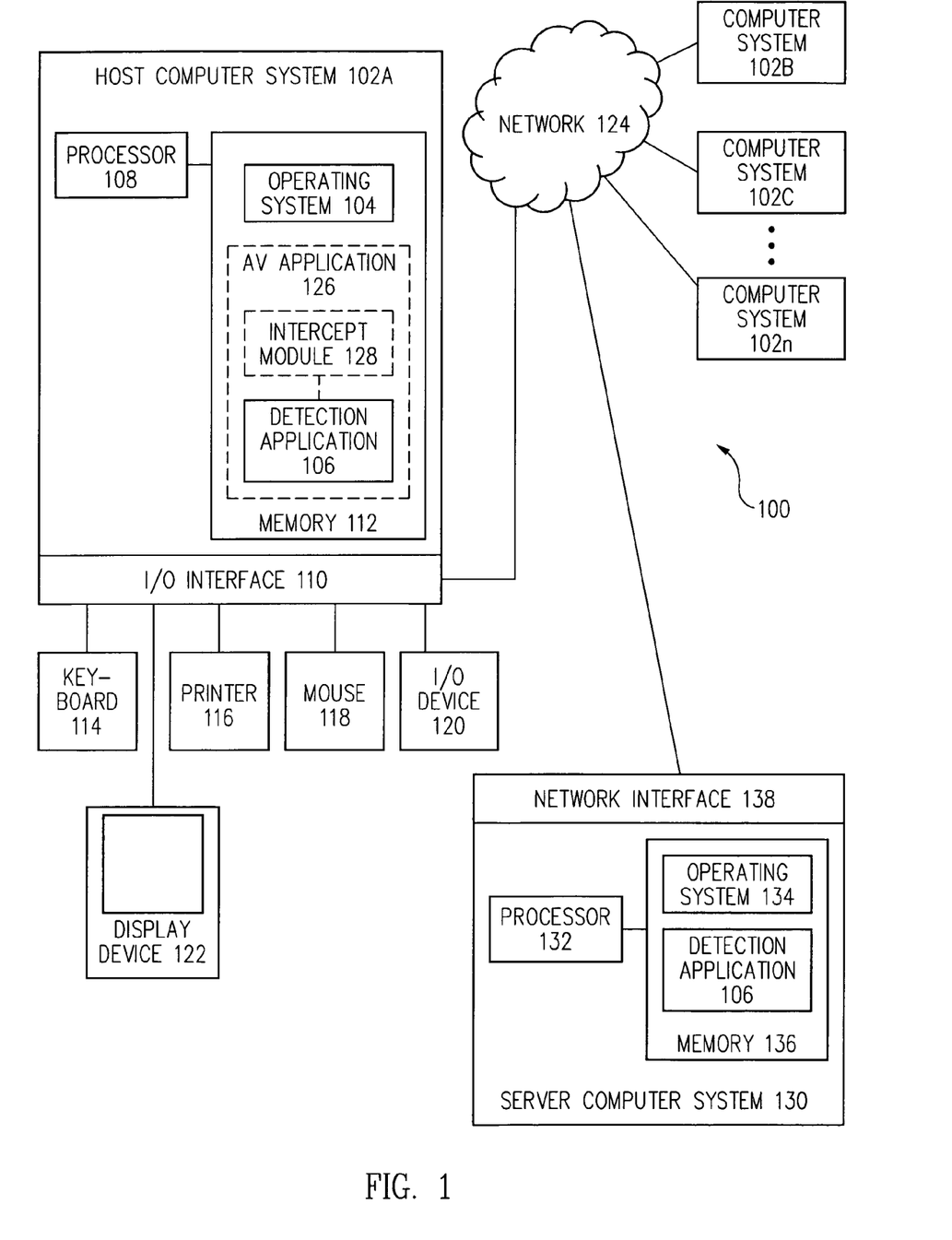
FIG. 1 illustrates a diagram of a client-server system including a detection application executing on a host computer system in accordance with one embodiment of the present invention.

Accordingly, FIG. 1 illustrates a diagram of a client-server system 100 including detection application 106 executing on host computer system 102A in accordance with one embodiment of the present invention. Host computer system 102A can be a stand-alone computer system, such as a personal computer or workstation, as illustrated in FIG. 1 by host computer system 102A. Host computer system 102A can also be configured as part of client-server system 100 also illustrated in FIG. 1 in which host computer system 102A interacts with a server computer system 130 via a network 124, such as the Internet.

Detection application 106 is described herein as executing on host computer system 102A, e.g., a first computer system. However, in light of this disclosure, those of skill in the art will understand that the description is applicable to client-server system 100 and computer systems 102B-102n, interacting simultaneously or serially with server computer system 130, e.g., a second computer system.

Host computer system 102A, sometimes called a client or user device, typically further includes a processor 108, an input/output (I/O) interface 110, an operating system 104, and a memory 112. In one embodiment, memory 112 includes a main memory, as well as any supplemental memories, and includes executable areas, data storage areas, and any memory areas needed by host computer system 102A (including operating system 104).

Host computer system 102A may additionally include: standard input devices, such as a keyboard 114 and a mouse 118; standard output devices, such as a printer 116 and a display device 122; as well as one or more standard input/output (I/O) devices 120, such as a compact disk (CD) or DVD drive, floppy disk drive, or other digital or waveform port for inputting data to and/or outputting data from host computer system 102A.

In one embodiment, detection application 106 is loaded into memory 112 of host computer system 102A via I/O device 120, such as from a CD or floppy disk containing detection application 106. In other embodiments, detection application 106 is part of another application, such as an anti-viral (AV) application 126, for example, a behavior blocking application, which is loaded into memory 112 of host computer system 102A. In some embodiments, AV application 126 includes an intercept module 128 for intercepting file system events including a file name. In some embodiments, detection application 106 can be stored on server computer system 130 and downloaded to host computer system 102A via network 124, separately or as part of AV application 126.

As illustrated, server computer system 130 of client-server system 100 is coupled to host computer system 102A by network 124. Network 124 can be any network or network system that is of interest to a user, including for example, Simple Mail Transfer Protocol (SMTP) networks and peer-to-peer (P2P) networks, among others.

Server computer system 130 typically includes: a network interface 138 for communicating with network 124; a processor 132; an operating system 134; and, a memory 136. As earlier described, in some embodiments, detection application 106 is stored in memory 136 for downloading to host computer system 102A.

Server computer system 130 can further include a display, a keyboard, a mouse, and other input/output (I/O) devices, not shown. As shown in FIG. 1, in one embodiment, a plurality of host computer systems 102B-102n similar to host computer system 102A are coupled to host computer system 102A and server computer system 130 by network 124.

The particular type of and configuration of host computer system 102A, computer systems 102B-102n, and server computer system 130 are not essential to this embodiment of the present invention. In various embodiments, network interface 138 and I/O interface 110 include analog modems, digital modems, or a network interface card.

FIG. 2 illustrates a process flow diagram of a host computer method 200 for detecting dangerous file name extensions in accordance with one embodiment of the present invention. Herein a file name extension is defined as including the separator dot, ".". For example, the file name extension ".txt" includes the separator dot and the three letters ".txt" designated as a text file format file name extension. It can be appreciated by those of skill in the art that in other embodiments, a file name extension can be differently defined, and the separator dot need not be part of the file name extension, for example "txt". Referring now to FIGS. 1 and 2 together, in one embodiment, execution of detection application 106 by processor 108 results in the operations of host computer method 200 as described below.

From an ENTER operation 202, processing transitions to an INTERCEPT FILE SYSTEM EVENT operation 204.

In INTERCEPT FILE SYSTEM EVENT operation 204, a file system event including a file name that identifies a file is intercepted prior to execution by detection application 106. In one embodiment, a file system event is a computer process that creates, accesses, renames, or launches the file.

In one embodiment, the file system event is intercepted regardless of the originating application or program code. In an alternative embodiment, a file system event is intercepted when it originates from a selected category (or categories) of applications, for example, a file system event that originates from a network application, such as a peer-to-peer (P2P) application, an electronic mail (e-mail) application, and/or an instant messaging application.

In one embodiment, an intercept mechanism or module present in detection application 106, such as a file system filter driver or a hooking mechanism, intercepts the file system event. In some embodiments, the intercept module is part of another application, such as AV application 126, in which detection application 106 is included, rather than in detection application 106. For example, in one embodiment, AV application 126 utilizes an intercept module 128, such as a file system filter driver that intercepts file system events. The file system event is posted to interested functionalities, such as detection application 106, and the file name is made available to detection application 106 prior to execution of the file system event.

Upon intercepting the file system event, INTERCEPT FILE SYSTEM EVENT operation 204 transitions processing to a STALL FILE SYSTEM EVENT operation 206.

In STALL FILE SYSTEM EVENT operation 206, the file system event is stalled until a determination is made to release the file system event. In one embodiment, detection application 106 stalls the file system event, for example by storing or buffering the file system event in the intercept module or another memory structure. In other embodiments, AV application 126, and/or interception module 128 utilized by AV application 126, stalls the file system event, for example by storing or buffering the file system event in a memory structure. Upon stalling the file system event, STALL FILE SYSTEM EVENT operation 206 transitions processing to an OBTAIN FILE NAME operation 208.

In OBTAIN FILE NAME operation 208, the file name is obtained from the file system event. In one embodiment, detection application 106 determines the file name from the intercepted and stalled file system event. In other embodiments, in which detection application 106 is part of another application that intercepts and stalls the file system event, such as AV application 126, detection application 106 obtains the file name from AV application 126 or by other means, such as from a posting of the file system event. Upon obtaining the file name, OBTAIN FILE NAME operation 208 transitions processing to a PARSE FILE NAME operation 210.

In PARSE FILE NAME operation 210, the file name is parsed to obtain at least a last file name extension. In one embodiment, the file name is parsed to obtain a base name and any file name extensions found. In one embodiment, each of the file name extensions is listed in a found file name extension(s) list with reference to the position of the file name extension in the file name as further described with reference to FIG. 3. In one embodiment, the found file name extension(s) list is stored in detection application 106, such as in a memory structure, however, in other embodiments, the found file name extension(s) list is stored in other memory structures, such as in a memory structure utilized by AV application 126, and accessible by detection application 106.

FIG. 3 illustrates an example of a malicious code file name 300 including multiple file name extensions. For example, referring to FIGS. 2 and 3 together, in PARSE FILE NAME operation 210, malicious code file name 300 is received and parsed to obtain a base name 302 of "iloveyou", a last file name extension 306 of ".vbs", and a next to last file name extension 304 of ".txt". In one embodiment, the next to last file name extension 304 and last file name extension 306 are listed in a found file name extension(s) list with reference to their positions in malicious code file name 300, respectively, next to last (from the end of the file name) and last (from the end of the file name). It can be appreciated by those of skill in the art that in other embodiments, other conventions can be used to relate the position of a file name extension within a file name. Upon parsing the file name, PARSE FILE NAME operation 210 transitions processing to a SINGLE FILE NAME EXTENSION check operation 212.

In SINGLE FILE NAME EXTENSION check operation 212, in one embodiment, the file name extension(s) in the found file name extension(s) list are examined to determine whether there is only a single file name extension listed, i.e., there is only a single file name extension of the file name. Upon a determination that there is only a single file name extension ("YES"), SINGLE FILE NAME EXTENSION check operation 212 transitions processing to a RELEASE FILE SYSTEM EVENT operation 214.

In RELEASE FILE SYSTEM EVENT operation 214, in one embodiment, the stalled file system event is released. For example, in one embodiment, in which detection application 106 intercepts and stalls the file system event, the file system event is released from detection application 106. In other embodiments, in which detection application 106 is part of another application, such as AV application 126, detection application 106 generates and returns a response, for example that a dangerous file name extension was not found and/or an indication that the file system event should be released. Upon release of the file system event, the file system event is performed, e.g., the file having the file name is created, accessed, renamed, or launched. From RELEASE FILE SYSTEM EVENT operation 214, processing transitions to an EXIT operation 226 in which processing exits method 200.

Referring again to SINGLE FILE NAME EXTENSION check operation 212, alternatively, upon a determination that there is not a single file name extension ("NO"), e.g., the file name includes multiple file name extensions, SINGLE FILE NAME EXTENSION check operation 212, optionally, transitions processing to a BY-PASS OPTION SELECTED check operation 216.

In optional BY-PASS OPTION SELECTED check operation 216, an optional user configuration setting is provided to a user allowing the user to by-pass the remainder of method 200 when the last file name extension is visible to the user, for example, that last file name extension 306, ".vbs", is visible to the user. This option allows a user to evaluate the risk associated with a particular file name when the last file name extension is visible. In one embodiment, this configuration option is part of detection application 106, while in other embodiments this configuration option is part of another application, such as AV application 126.

Upon a determination that the user configuration option setting was selected ("YES"), BY-PASS OPTION SELECTED check operation 216 transitions processing to a FILE NAME EXTENSION VISIBLE check operation 218. Alternatively, upon a determination that the user configuration setting was not selected ("NO"), BY-PASS OPTION SELECTED check operation 216, transitions processing to a DANGEROUS FILE NAME EXTENSION OPERATION 220 further described herein.

In FILE NAME EXTENSION VISIBLE check operation 218, a determination is made whether the last file name extension in the found file name extension(s) list, e.g., last file name extension 306, ".vbs", is visible to the user. For example, in one embodiment, this determination is made by checking display mode settings in the operating system, such as display mode settings in operating system 104.

Upon a determination that the last file name extension is visible to the user ("YES"), from FILE NAME EXTENSION VISIBLE check operation 218, processing transitions to RELEASE FILE SYSTEM EVENT operation 214 with processing exiting method 200 at EXIT operation 226. Alternatively, upon a determination that the last file name extension is not visible to the user ("NO"), from FILE NAME EXTENSION VISIBLE check operation 218, processing transitions to DANGEROUS FILE NAME EXTENSION check operation 220.

Figure 4:
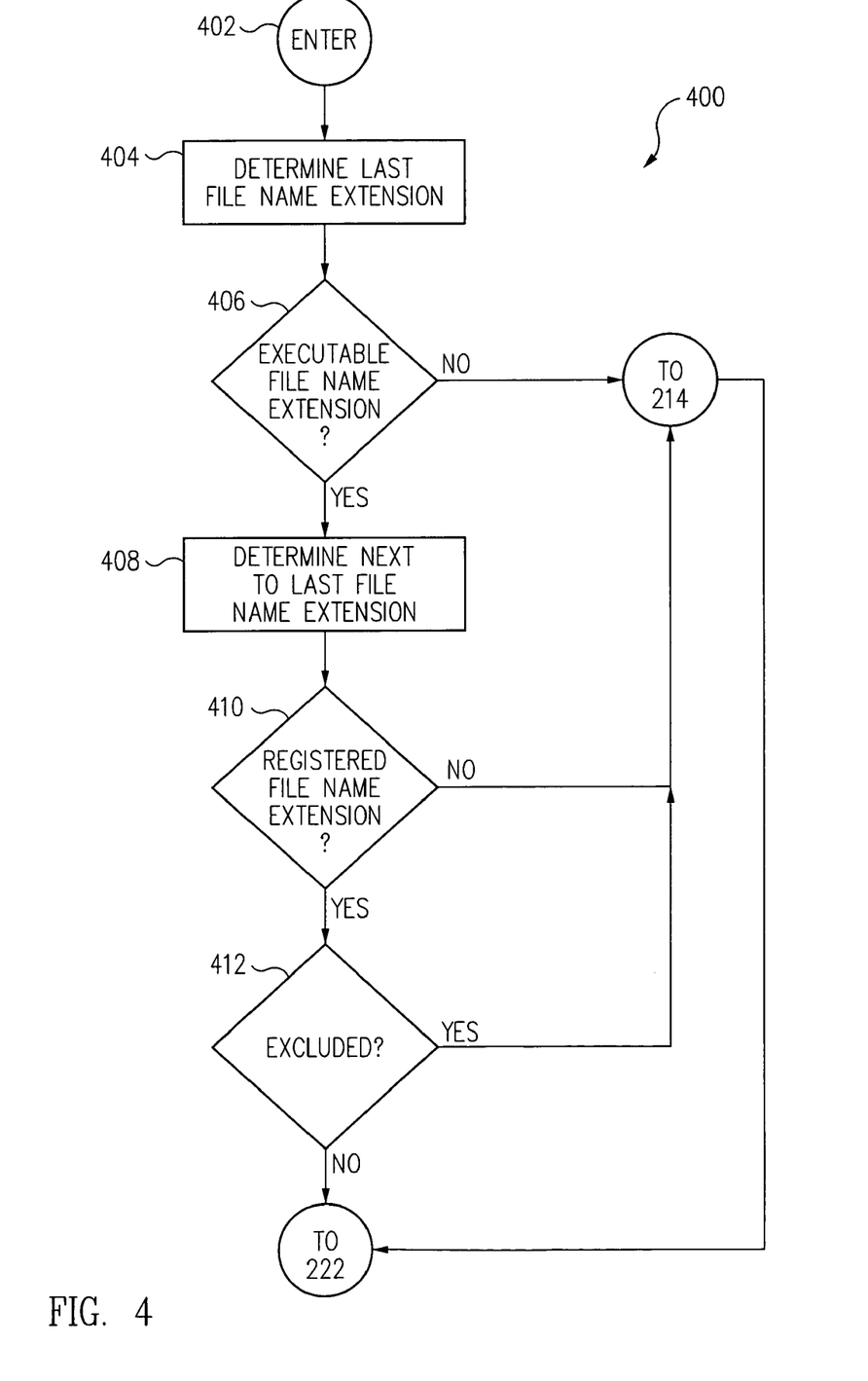
FIG. 4 illustrates a process flow diagram of a host computer method used in the dangerous file name extension check operation of FIG. 2 in accordance with one embodiment of the present invention.

In DANGEROUS FILE NAME EXTENSION check operation 220, the file name extensions in the found file name extension(s) list are examined to determine whether a dangerous file name extension is detected as further described herein with reference to method 400 and FIG. 4. Upon a determination that a dangerous file name extension is not detected ("NO"), DANGEROUS FILE NAME EXTENSION check operation 220 transitions processing to RELEASE FILE SYSTEM EVENT operation 214 with processing exiting method 200 at EXIT operation 226.

Referring again to DANGEROUS FILE NAME EXTENSION check operation 220, alternatively, upon a determination that a dangerous file name extension is detected ("YES"), DANGEROUS FILE NAME EXTENSION check operation 220 transitions processing to a NOTIFY operation 222.

In NOTIFY operation 222, a notification is generated. In one embodiment, the notification includes an indication that a dangerous file name extension is detected. In some embodiments, the notification further indicates any protective actions taken as further described herein with reference to optional PROTECTIVE ACTION(S) operation 224. In some embodiments, the notification includes an identification of the dangerous file name extension and/or other information associated with the dangerous file name extension.

In some embodiments, the user of the host computer system and/or other individuals or systems, such as virus collections centers are notified. The notification is provided using any of a variety of techniques, such as by using a pop up window, by writing to a file and/or by otherwise logging the event. In some embodiments, the notification is provided to another application, such as AV application 126. Upon notification, from NOTIFY operation 222 processing transitions to EXIT operation 226 and exits method 200. Optionally, NOTIFY operation 222 transitions processing to a PROTECTIVE ACTION(S) operation 224.

In PROTECTIVE ACTION(S) operation 224, any, some, or all of a wide variety of protective actions are implemented. In one embodiment, the file system event is terminated and prevented from executing. Upon implementation of the protective actions, from optional PROTECTIVE ACTION(S) operation 224, processing transitions to EXIT operation 226 with processing exiting method 200.

Referring again to SINGLE FILE NAME EXTENSION check operation 212, when the by-pass option is not utilized, upon a determination that there is not a single file name extension ("NO"), SINGLE FILE NAME EXTENSION check operation 212 transitions processing to DANGEROUS FILE NAME EXTENSION check operation 220 and BY-PASS OPTION SELECTION check operation 216 and FILE NAME EXTENSION VISIBLE check operation 218 are not performed.

FIG. 4 illustrates a process flow diagram of a host computer method 400 used in dangerous file name extension check operation 220 of FIG. 2 in accordance with one embodiment of the present invention. Referring to FIGS. 1, 2, 3 and 4 together, in one embodiment, as earlier described with reference to method 200 and FIG. 2, method 400 is entered at ENTER operation 402 from SINGLE FILE NAME EXTENSION check operation 212, from optional BY-PASS OPTION SELECTED check operation 216, or from optional FILE NAME EXTENSION VISIBLE check operation 218. From ENTER operation 402, processing transitions to a DETERMINE LAST FILE NAME EXTENSION operation 404.

In DETERMINE LAST FILE NAME EXTENSION operation 404, the last file name extension of the file name, for example, last file name extension 306, ".vbs", is determined. In one embodiment, the last file name extension is determined from the found file name extension(s) list. Upon determining the last file name extension of the file name, DETERMINE LAST FILE NAME EXTENSION operation 404 transitions processing to an EXECUTABLE FILE NAME EXTENSION check operation 406.

In EXECUTABLE FILE NAME EXTENSION check operation 406, a determination is made whether the last file name extension identified in DETERMINE LAST FILE NAME EXTENSION operation 404, e.g., last file name extension 306, ".vbs", is an executable file name extension. In one embodiment, the last file name extension is compared to entries of executable file name extensions listed in an executable file name extension list and known to indicate an executable file format, such as ".vbs", ".src", and ".exe".

When the last file name extension matches an entry of an executable file name extension in the executable file name extension list, the last file name extension is determined to be an executable file name extension. For example, assuming the executable file name extension list includes the entry ".vbs", last file name extension 306; ".vbs", matches the entry, and thus is determined an executable file name extension.

Alternatively, when the last file name extension does not match an entry of an executable file name extension in the executable file name extension list, the last file name extension is determined not to be an executable file name extension. For example, typically, last file name extensions of ".jpg" or ".bmp" are not executable. Assuming the executable file name extension list does not include the entries ".jpg" or ".bmp", a last file name extension of ".jpg" or ".bmp" does not match an entry, and thus is determined not to be an executable file name extension.

In one embodiment, the executable file name extension list is a database, configuration file, or other list in detection application 106. In other embodiments, the executable file name extension list is located elsewhere and is accessible by detection application 106, such as in a configuration file of AV application 126.

In an alternative embodiment, rather than comparing the last file name extension to entries of executable file name extensions listed in an executable file name extension list, the file is located and the file contents are examined to determine whether the file is executable. Upon a determination that the file is executable, the last file name extension is determined to be an executable file name extension. Alternatively, upon a determination that the file is not executable, the last file name extension is determined not to be an executable file name extension.

For example, in a Windows®32 operating system, the file is located using the file name (operation 208). The file is opened and the file contents are accessed and examined to determine if a Portable Executable (PE) header is present, such as by parsing the contents of the file. Accessing file contents, content parsing, PE file format and PE headers are well known to those of skill in the art and are not further described herein for clarity of description. When the PE header is present, the file is determined to be executable, and thus, the last file name extension is determined to be an executable file name extension. Alternatively, when the PE header is not present, the file is determined to not be executable, and thus, the last file name extension is determined to not be an executable file name extension.

In one embodiment, upon a determination that the last file name extension is not an executable file name extension ("NO"), the last file name extension is determined not to be dangerous, and from EXECUTABLE FILE NAME EXTENSION check operation 406 processing transitions to operation 214 of method 200 and exits method 400.

Alternatively, upon a determination that the last file name extension matches an entry in the executable file name extension list, or in the alternative embodiment, that the file is an executable file, the last file name extension is determined to be an executable file name extension ("YES"). From EXECUTABLE FILE NAME EXTENSION check operation 406 processing transitions to a DETERMINE NEXT TO LAST FILE NAME EXTENSION operation 408.

In DETERMINE NEXT TO LAST FILE NAME EXTENSION operation 408, the next to last file name extension of the file name is determined. In one embodiment, the next to last file name extension, for example, next to last file name extension 304, ".txt", is determined from the found file name extension(s) list. Upon determining the next to last file name extension, from DETERMINE NEXT TO LAST FILE NAME EXTENSION operation 408, processing transitions to a REGISTERED FILE NAME EXTENSION check operation 410.

In REGISTERED FILE NAME EXTENSION check operation 410, a determination is made whether the next to last file name extension identified in DETERMINE NEXT TO LAST FILE NAME EXTENSION operation 408, e.g., next to last file name extension 304, ".txt", is a registered file name extension. In one embodiment, the next to last file name extension is compared to entries of registered file name extensions listed in a file name extension registry. In one embodiment, the file name extension registry is a database, configuration file, or other list in detection application 106. In other embodiments, the file name extension registry is located elsewhere and is accessible by detection application 106, such as in a configuration file of AV application 126. In some embodiments, the file name extension registry is augmented by file name extension entries stored in other databases, configuration files, or lists, such as the system registry used by the file manager in operating system 104.

In some embodiments, the file name extension registry includes known non-executing file name extensions. In other embodiments, the file name extension registry includes file name extensions known to indicate malicious code in combination with an executable, last file name extension. In other embodiments, the file name extension registry includes a combination of the above file name extensions. Upon a determination that the next to last file name extension does not match an entry in the file name extension registry ("NO"), the last file name extension is determined to be not dangerous. For example, if next to last file name extension 304, ".txt", does not match an entry in the file name extension registry, last file name extension 306, ".vbs", is determined not to be a dangerous file name extension. Thus, in one embodiment, upon a determination that the next to last file name extension does not match an entry in the file name extension registry and the last file name extension is an executable file name extension, the last file name extension is determined not to be dangerous and from REGISTERED FILE NAME EXTENSION check operation 410 processing transitions to RELEASE FILE SYSTEM EVENT operation 214 of method 200 and exits method 400.

Referring again to REGISTERED FILE NAME EXTENSION check operation 410, alternatively, upon a determination that the next to last file name extension matches an entry in the file name extension registry ("YES"), the last file name extension is tentatively determined to be a dangerous file extension, unless it is later excluded. For example, if next to last file name extension 304, ".txt", matches an entry on the file name extension registry, its combination with executable last file name extension 306, ".vbs", tentatively indicates last file name extension 306 is a dangerous file name extension, unless it is later excluded. From REGISTERED FILE NAME EXTENSION check operation 410, processing transitions to an EXCLUDED check operation 412.

In EXCLUDED check operation 412, a determination is made whether the next to last file name extension, e.g., next to last file name extension 304, ".txt", is an excluded file name extension. In one embodiment, the next to last file name extension is compared to entries of excluded file name extensions listed in an exclusion list. In one embodiment, the exclusion list includes entries of next to last file name extensions to be excluded from a determination of the last file name extension as dangerous.

In one embodiment, the exclusion list is a database, configuration file, or other list in detection application 106. In other embodiments, the exclusion list is stored in a memory structure accessible by detection application 106, such as in a configuration file of AV application 126.

Upon a determination that the next to last file name extension matches an entry on the exclusion list ("YES"), the last file name extension is determined not to be dangerous. For example, if next to last file name extension 304, ".txt", matches an entry on the exclusion list, the last file name extension 306, ".vbs", is determined to be not dangerous. From EXCLUDED check operation 412 processing transitions to RELEASE FILE SYSTEM EVENT operation 214 of method 200 and exits method 400.

Referring again to EXCLUDED check operation 412, alternatively, upon a determination that the next to last file name extension does not match an entry on the exclusion list ("NO"), the last file name extension is determined to be dangerous. For example, if next to last file name extension 304, ".txt", does not match an entry on the exclusion list, last file name extension 306, ".vbs", is determined to be dangerous, e.g., indicative of malicious code, and from EXCLUDED check operation 412 processing transitions to NOTIFY operation 222 of method 200 and exits method 400.

Figure 5:
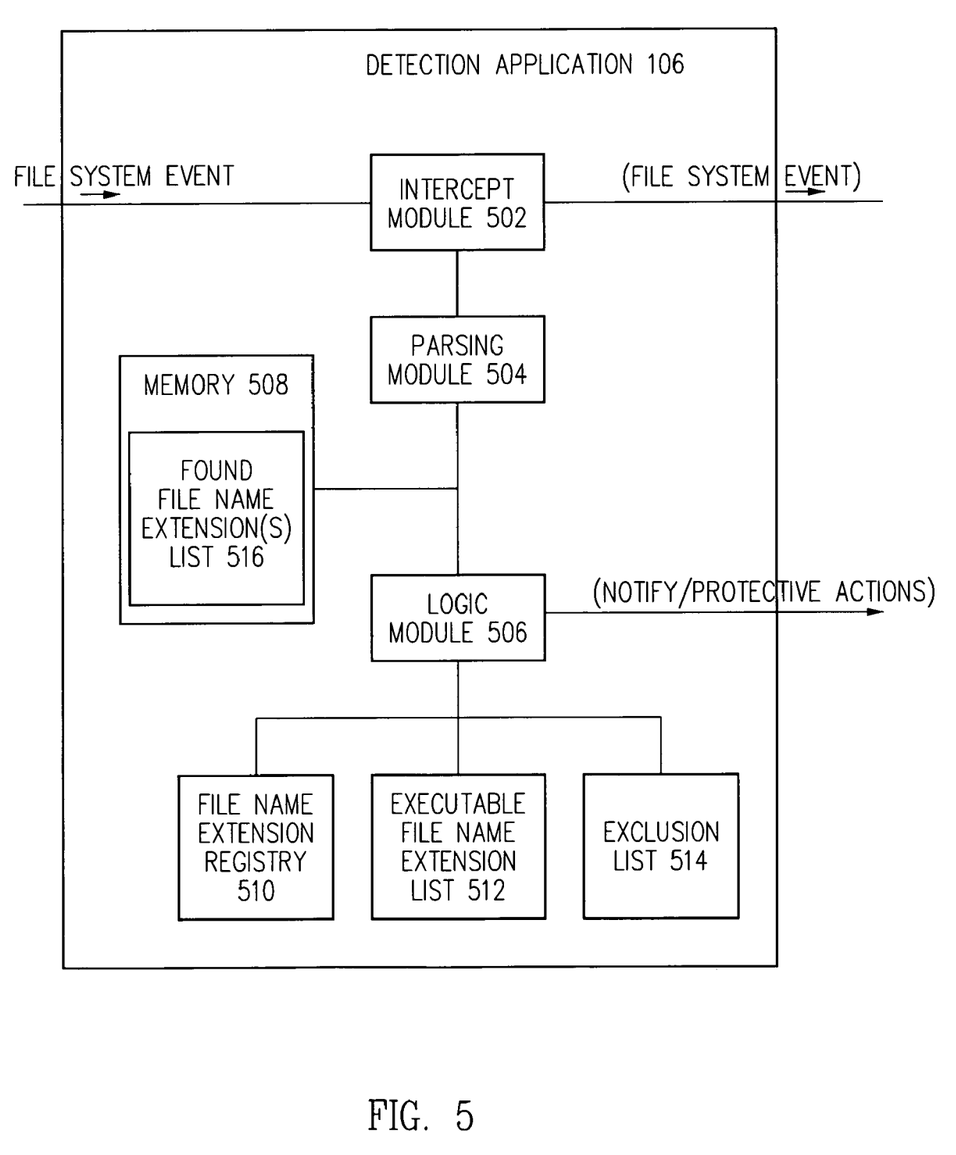
FIG. 5 illustrates a functional block diagram of the detection application of FIG. 1 in accordance with one embodiment of the present invention.

FIG. 5 illustrates a functional block diagram of detection application 106 of FIG. 1 in accordance with one embodiment of the present invention. In the present embodiment, detection application 106 is illustrated as independent of another application, such as AV application 126. In other embodiments, in which detection application 106 is part of another application, such as AV application 126, detection application 106 can include fewer, more or different modules, dependent on the processes available in the other application.

In one embodiment, detection application 106 includes an intercept module 502, a parsing module 504, a logic module 506, a memory 508, a file name extension registry 510, an executable file name extension list 512, an exclusion list 514, and a found file name extension(s) list 516. In some embodiments, file name extension registry 510, executable file name extension list 512, and exclusion list 514 include pre-defined entries, however, in some embodiments, the pre-defined entries are user extendible.

In one embodiment, as earlier described with reference to methods 200 and 400, intercept module 502 intercepts and stalls a file system event including a file name. In one embodiment, the file system event is stored or buffered in intercept module 502.

The file name is obtained from the file system event and passed from intercept module 502 to parsing module 504 which parses the file name to obtain at least a last file name extension and a next to last file name extension, when present. In one embodiment, the file name is parsed into a base name, a last file name extension and at least a next to last file name extension, when present. The parsing module 504 generates a found file name extension(s) list 516 as earlier described with reference to method 200. In one embodiment, found file name extension(s) list 516 is stored in memory 508.

Utilizing found file name extension(s) list 516, logic module 506 determines whether there is only a single file name extension. Upon a determination that there is only a single file name extension, logic module 506 generates an indication that the file system event can be released and the file system event is released from detection application 106, for example, from intercept module 502.

Alternatively, upon a determination that there is more that a single file name extension, logic module 506 determines whether the last file name extension is dangerous as earlier described with reference to method 400 and FIGS. 1, 2, 3 and 4 utilizing found file name extension(s) list 516, executable file name extension list 512, file name extension registry 510, and exclusion list 514, as needed.

Upon a determination that the last file name extension is not a dangerous file name extension, logic module 506 generates an indication that the last file name extension is determined not to be dangerous, and the file system event is released from detection application 106 as earlier described.

Alternatively, upon a determination that the last file name extension is a dangerous file name extension, logic module 506 generates an indication that the last file name extension is determined to be dangerous, and further generates a notification as earlier described. Optionally, logic module 506 implements protective actions, such as terminating the file system event.

In other embodiments, any, some or all of intercept module 502, file name extension registry 510, executable file name extension list 512, and exclusion list 514 are located elsewhere, such as in AV application 126, and/or augmented by databases, configuration files, or lists in other programs, for example, in operating system 104, and are accessible by detection application 106.

In some embodiments, detection application 106 includes a configuration module (not shown) permitting the user to select the by-pass option earlier described with reference to FIG. 2 and method 200.

Referring again to FIG. 1, in one embodiment, detection application 106 is stored in computer memory 112. As used herein, a computer memory refers to a volatile memory, a non-volatile memory, or a combination of the two.

Although detection application 106 is referred to as an application, this is illustrative only. Detection application 106 should be capable of being called from an application or an operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a stand-alone computer system or client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line, including optical interfaces and optical carriers.

More specifically, in one embodiment, host computer system 102A and/or server computer system 130 is a portable computer, a workstation, a two-way pager, a cellular telephone, a digital wireless telephone, a personal digital assistant, a server computer, an Internet appliance, or any other device that includes components that can execute the detection functionality in accordance with at least one of the embodiments as described herein. Similarly, in another embodiment, host computer system 102A and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the dangerous file name extension detection functionality in accordance with the various embodiments of the present invention described herein can be implemented in a wide variety of computer system configurations. In addition, the dangerous file name extension detection functionality could be stored as different modules in memories of different devices. For example, detection application 106 could initially be stored in server computer system 130, and then as necessary, a portion of detection application 106 could be transferred to host computer system 102A and executed on host computer system 102A. Consequently, part of the dangerous file name extension detection functionality would be executed on processor 132 of server computer system 130, and another part would be executed on processor 108 of host computer system 102A. In view of this disclosure, those of skill in the art can implement various embodiments of the present invention in a wide-variety of physical hardware configurations using an operating system and computer programming language of interest to the user.

In yet another embodiment, detection application 106 is stored in memory 136 of server computer system 130. Detection application 106 is transferred over network 124 to memory 112 in host computer system 102A. In this embodiment, network interface 138 and I/O interface 110 would include analog modems, digital modems (including optical modems), or a network interface card. When modems are used, network 124 includes a communications network, and detection application 106 is downloaded via the communications network.

Further, although exemplar file names having multiple file name extensions are described herein with regard to double file name extensions, e.g., a last file name extension and a next to last file name extension, the invention is not limited thereto, and is applicable to file names including a greater number of file name extensions.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   stalling a file system event, said file system event including a file name;
   parsing said file name to obtain at least a last file name extension, and a next to last file name extension, when present, of said file name;
   determining whether said last file name extension is the only file name extension of said file name;
   upon a determination that said last file name extension is not the only file name extension of said file name, determining whether said last file name extension is a dangerous file name extension; and
   upon a determination that said last file name extension is a dangerous file name extension, generating a notification.

2. The method of claim 1, further comprising:
   implementing protective actions.

3. The method of claim 1, further comprising:
   terminating said file system event.

4. The method of claim 1, further comprising:
   intercepting said file system event.

5. The method of claim 4, wherein said file system event originates from a selected category of applications.

6. The method of claim 5, wherein said selected category of applications is a network application.

7. The method of claim 4, wherein said file system event originates from an instant messaging application.

8. The method of claim 4, wherein said file system event originates from an electronic mail (e-mail) application.

9. The method of claim 4, wherein said file system event originates from a peer-to-peer (P2P) network application.

10. The method of claim 1, further comprising:
    obtaining said file name from said file system event.

11. The method of claim 1, wherein upon a determination that said last file name extension is the only file name extension of said file name, said method further comprising:
    releasing said file system event.

12. The method of claim 1, wherein upon a determination that said last file name extension is not dangerous, said method further comprising:
    releasing said file system event.

13. The method of claim 1, further comprising:
    prior to said determining whether said last file name extension is a dangerous file name extension, determining whether a by-pass option is selected, wherein selection of said by-pass option by-passes said determining whether said last file name extension is a dangerous file name extension when said last file name extension is visible to a user; and
    upon a determination that said by-pass option is selected, determining whether said last file name extension is visible to a user.

14. The method of claim 13, wherein upon a determination that said last file name extension is not visible to a user, said method further comprising:
    performing said determining whether said last file name extension is a dangerous file name extension.

15. The method of claim 13, wherein upon a determination that said last file name extension is visible to a user, said method further comprising:
    not performing said determining whether said last file name extension is a dangerous file name extension; and
    releasing said file system event.

16. The method of claim 13, wherein upon a determination that said by-pass option is not selected, said method further comprising:
    performing said determining whether said last file name extension is a dangerous file name extension.

17. The method of claim 1, wherein said determining whether said last file name extension is a dangerous file name extension comprises:
    determining said last file name extension;
    determining whether said last file name extension is an executable file name extension;
    upon a determination that said last file name extension is an executable file name extension, determining said next to last file name extension;
    determining whether said next to last file name extension is a registered file name extension;
    upon a determination that said next to last file name extension is a registered file name extension, determining whether said next to last file name extension is an excluded file name extension; and
    upon a determination that said next to last file name extension is not an excluded file name extension, determining that said last file name extension is dangerous.

18. The method of claim 17, wherein upon a determination that said last file name extension is not an executable file name extension, said method further comprising:
    releasing said file system event.

19. The method of claim 17, wherein said determining whether said last file name extension is an executable file name extension, comprises:
    comparing said last file name extension to one or more entries of executable file name extensions in an executable file name extension list to determine whether said last file name extension matches at least one of said one or more entries of executable file name extensions;
    upon a determination that said last file name extension matches said at least one of said one or more entries of executable file name extensions, determining said last file name extension is an executable file name extension; and upon a determination that said last file name extension does not match said at least one of said one or more entries of executable file name extension, determining said last file name extension is not an executable file name extension.

20. The method of claim 17, wherein said determining whether said last file name extension is an executable file name extension, comprises:
  locating a file associated with said file name;
  opening said file to access the contents of said file;
  examining said contents to determine whether said file is an executable file;
  wherein upon a determination that said file is an executable file, determining said last file name extension is an executable file name extension; and
  wherein upon a determination that said file is not an executable file, determining said that said last file name extension is not an executable file name extension.

21. The method of claim 17, wherein upon a determination that said next to last file name extension is not a registered file name extension, said method further comprising:
  determining that said last file name extension is not dangerous.

22. The method of claim 17, wherein upon a determination that said next to last file name extension is an excluded file name extension, said method further comprising:
  determining that said last file name extension is not dangerous.

23. A system comprising:
  an anti-viral application, said anti-viral application for intercepting and stalling a file system event including a file name; and
  a detection application communicatively coupled to said anti-viral application, said detection application for detecting a dangerous file name extension present in said file name, wherein said detection application comprises:
    a parsing module for obtaining said file name and for parsing said file name to obtain at least a last file name extension, and a next to last file name extension, when present, of said file name;
    a logic module for determining whether said last file name extension is a dangerous file name extension; and
    a found file name extension(s) list for storing at least said last file name extension and said next to last file name extension, when present.

24. The system of claim 23, wherein said anti-viral application is a behavior blocking application.

25. The system of claim 23, wherein said anti-viral application comprises:
  an intercept module for intercepting and stalling said file system event including said file name.

26. The system of claim 23, wherein said anti-viral application further comprises:
  an executable file name extension list;
  a file name extension registry; and
  an exclusion list.

27. The system of claim 23,
  wherein said detection application further comprises:
    an executable file name extension list;
    a file name extension registry; and
    an exclusion list.

28. A computer program product comprising a computer-readable medium containing computer program code for a method comprising:
  stalling a file system event, said file system event including a file name;
  parsing said file name to obtain at least a last file name extension, and a next to last file name extension, when present, of said file name;
  determining whether said last file name extension is the only file name extension of said file name;
  upon a determination that said last file name extension is not the only file name extension of said file name, determining whether said last file name extension is a dangerous file name extension; and
  upon a determination that said last file name extension is a dangerous file name extension, generating a notification.

29. The computer program product of claim 28, said method further comprising:
  implementing protective actions.

30. The computer program product of claim 28, said method further comprising:
  terminating said file system event.

31. The computer program product of claim 28, wherein said determining whether said last file name extension is a dangerous file name extension comprises:
  determining said last file name extension;
  determining whether said last file name extension is an executable file name extension;
  upon a determination that said last file name extension is an executable file name extension, determining said next to last file name extension;
  determining whether said next to last file name extension is a registered file name extension;
  upon a determination that said next to last file name extension is a registered file name extension, determining whether said next to last file name extension is an excluded file name extension; and
  upon a determination that said next to last file name extension is not an excluded file name extension, determining that said last file name extension is dangerous.

* * * * *

UNITED STATES PATENT AND TRADEMARK OFFICE
CERTIFICATE OF CORRECTION

PATENT NO. : 7,328,456 B1
APPLICATION NO. : 10/718375
DATED : February 5, 2008
INVENTOR(S) : Peter Szor et al.

It is certified that error appears in the above-identified patent and that said Letters Patent is hereby corrected as shown below:

In Column 15, Line 3, in Claim 19, replace "extension" with --extensions--; Line 17, in Claim 20, after "determining", delete "said".

Signed and Sealed this

Tenth Day of June, 2008

JON W. DUDAS
*Director of the United States Patent and Trademark Office*